United States Patent
Kanai

(10) Patent No.: US 11,093,188 B2
(45) Date of Patent: Aug. 17, 2021

(54) PRINTING APPARATUS, CONTROL METHOD, AND STORAGE MEDIUM FOR PROCESSING PRINT SETTINGS

(71) Applicant: CANON KABUSHIKI KAISHA, Tokyo (JP)

(72) Inventor: Yasunori Kanai, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/532,284

(22) Filed: Aug. 5, 2019

(65) Prior Publication Data
US 2020/0050411 A1    Feb. 13, 2020

(30) Foreign Application Priority Data

Aug. 10, 2018  (JP) .............................. JP2018-151365

(51) Int. Cl.
*G06F 3/12*  (2006.01)
(52) U.S. Cl.
CPC .......... *G06F 3/1256* (2013.01); *G06F 3/1234* (2013.01); *G06F 3/1274* (2013.01); *G06F 3/1287* (2013.01)
(58) Field of Classification Search
CPC .................................................... G06F 3/1256
USPC ........................................................ 358/1.15
See application file for complete search history.

(56) References Cited

U.S. PATENT DOCUMENTS

| | | | | |
|---|---|---|---|---|
| 2009/0201540 A1* | 8/2009 | Morooka | ................ | G06F 3/121 358/1.15 |
| 2013/0033726 A1* | 2/2013 | Sakura | .................. | G06F 3/1288 358/1.15 |
| 2013/0050760 A1* | 2/2013 | Sakuragi | ............... | G06F 3/1285 358/1.15 |
| 2015/0023683 A1* | 1/2015 | Akimoto | ............ | G03G 15/5016 399/75 |

FOREIGN PATENT DOCUMENTS

| | | |
|---|---|---|
| JP | 2017-113904 A | 6/2017 |
| RU | 2599535 C2 | 10/2016 |

OTHER PUBLICATIONS

Hastings, T. et al., "Internet Printing Protocol/ 1.1: Model and Semantics", The Internet Society, Sep. 2000.

* cited by examiner

*Primary Examiner* — Jacky X Zheng
(74) *Attorney, Agent, or Firm* — Canon U.S.A., Inc. IP Division

(57) ABSTRACT

A printing apparatus is provided and stores, in a storage unit, setting formation about a print operation using the printing apparatus. The printing apparatus receives a job setting value from a communication terminal, and determines whether a prohibition condition applies to the job setting value from the communication terminal based on the received job setting value and the setting value stored in the storage unit. The printing apparatus further notifies the communication terminal of information indicating the determination result.

21 Claims, 16 Drawing Sheets

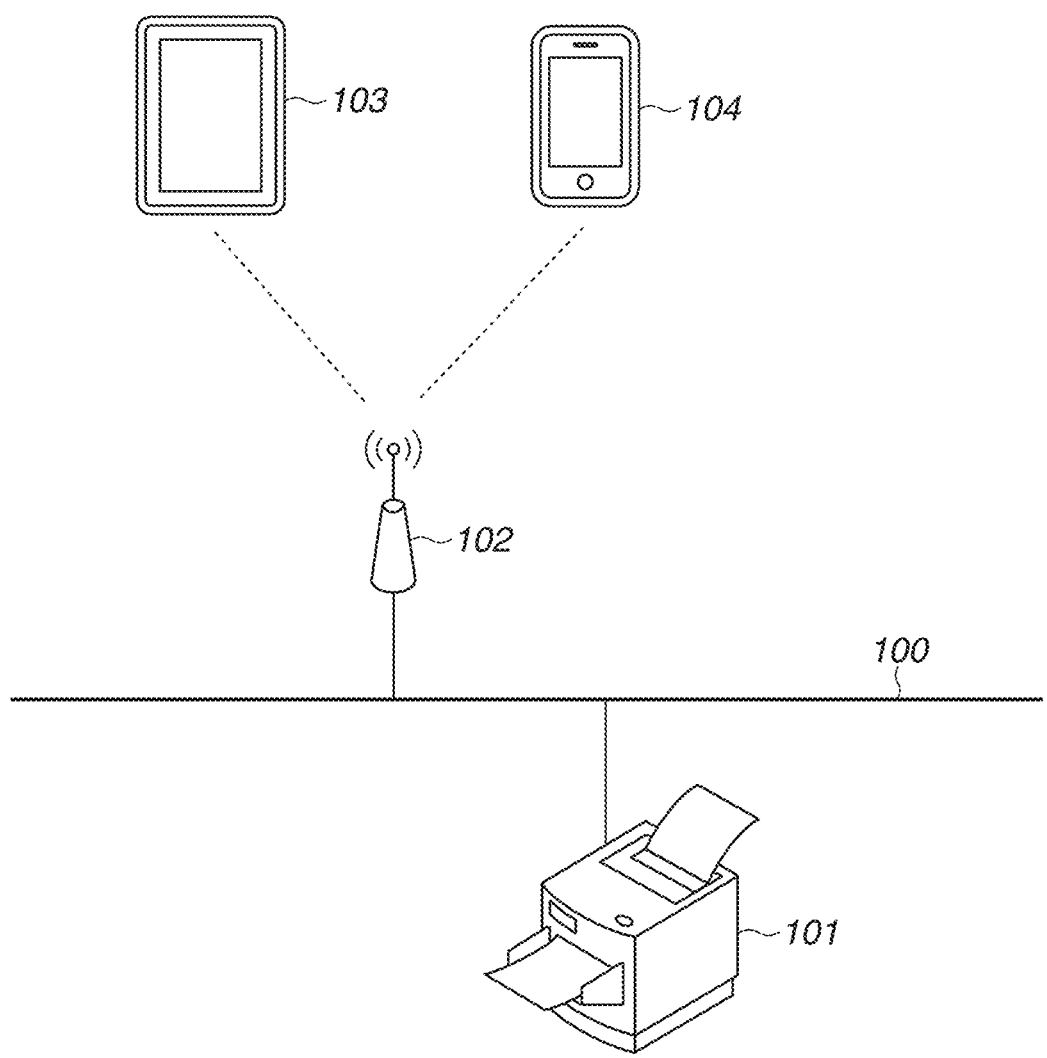

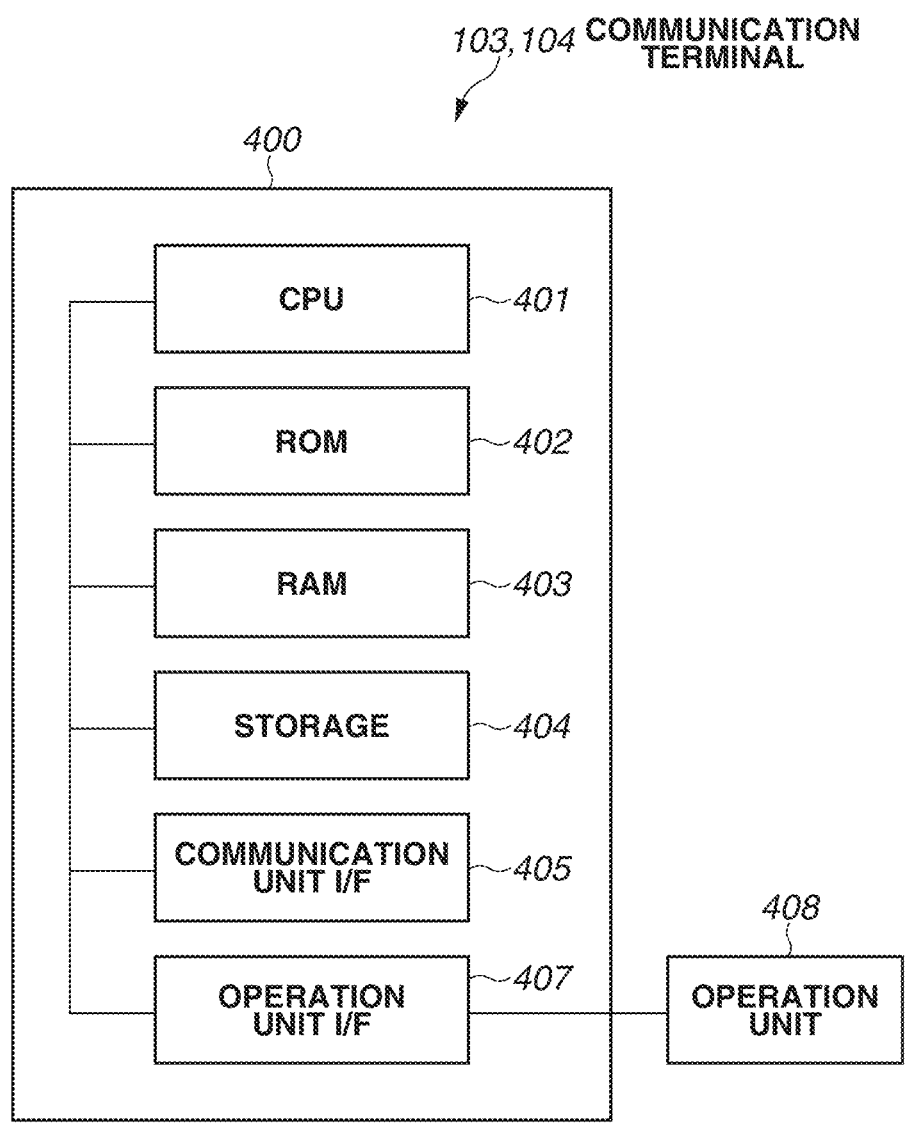

FIG.6A

6100: REQUEST

```
Internet Printing Protocol
version: 2.0
operation-id: Validate-Job (0x0004)
request-id: 2
operation-attributes-tag
  attributes-charset (charset): 'utf-8'
  attributes-natural-language (naturalLanguage): 'ja-jp'
  printer-uri (uri): 'ipp://Canon5F3D9D.local.:631/ipp/print'
  requesting-user-name (nameWithoutLanguage): 'kaneda'
  job-name (nameWithoutLanguage): 'LAND2P'
  document-format (mimeMediaType): 'application/pdf' job-attributes-tag
  media-col (collection):{media-size{x-dimension,y-dimension},media-bottom-
margin,media-left-margin,media-right-margin,media-top-margin}
  output-bin (keyword): 'auto'
  print-color-mode (keyword): 'color'
  print-quality (enum): normal media-type (keyword): 'transparency'            ~6101
  sides (keyword): 'one-sided' multiple-document-handling (keyword): 'separate-documents-collated-
copies'
  finishings (enum): punch
end-of-attributes-tag operation-attributes-tag
  attributes-charset (charset): 'utf-8'
  attributes-natural-language (naturalLanguage): 'ja-jp'
end-of-attributes-tag
```

6200: Case1

```
[NORMAL SYSTEM: CONTINUE PROCESSING]
Internet Printing Protocol
Validate-Job Response
version: 2.0
status-code: Successful (successful-ok)   ~6201
request-id: 2
operation-attributes-tag
  attributes-charset (charset): 'utf-8'
  attributes-natural-language (naturalLanguage): 'ja-jp'
end-of-attributes-tag
```

6300: Case2

```
[ERROR: EXCLUSION BASED ON DEVICE CAPABILITIES]
Internet Printing Protocol
Validate-Job Response          6301
version: 2.0                   (
status-code: Error(client-error-conflicting-attributes)

request-id: 2
operation-attributes-tag
  attributes-charset (charset): 'utf-8'
  attributes-natural-language (naturalLanguage): 'ja-jp' unsupported-attribute{
  sides:two-sided,
  media-type:transparency        ~6302
} end-of-attributes-tag
```

FIG.6B

6400:Case3

```
[ERROR: EXCLUSION BASED ON FUNCTION USABLE BY USER
(NOTIFICATION OF EXCLUSION INFORMATION AND RECOMMENDED SETTING)]
Internet Printing Protocol
Validate-Job Response
  version: 2.0
  status-code: Error (client-error-conflicting-attributes)  ~6401
  request-id: 2
  operation-attributes-tag
    attributes-charset (charset): 'utf-8'
    attributes-natural-language (naturalLanguage): 'ja-jp' unsupported-attribute{
      resolution:high,           ~6402
    } preferred-attribute{
      resolution:middle,         ~6403
    } end-of-attributes-tag
```

6600:Case4

```
[NORMAL SYSTEM (SOME OF ATTRIBUTES ARE IGNORED): CONTINUE PROCESSING]
Internet Printing Protocol
Validate-Job Response
  version: 2.0
  status-code: Successful (Successful-ok-conflicting-attributes)  ~6501
  request-id: 2
  operation-attributes-tag
    attributes-charset (charset): 'utf-8'
    attributes-natural-language (naturalLanguage): 'ja-jp'
  end-of-attributes-tag
```

FIG.7

| A | B | C | D | E | F | G | H | I | J | K | L | M | N | O | P | Q | R | S |
|---|---|---|---|---|---|---|---|---|---|---|---|---|---|---|---|---|---|---|
| | | | SHEET TYPE | | | SHEET SIZE | | | STAPLING | | | | TWO-SIDED PRINTING | RESOLUTION | | | COPY-FORGERY-INHIBITED PATTERN PRINTING | STAMP PRINTING |
| MANAGEMENT NUMBER | NUMBER OF PROHIBITION ITEMS (CONDITION UNITS) | DESCRIPTION OF RULE | PLAIN PAPER | THICK PAPER | OHP | A3 | A4 | A5 | UPPER LEFT | LOWER LEFT | LOWER RIGHT | UPPER RIGHT | | LOW | MEDIUM | HIGH | | |
| 1 | 2 | OHP SHEET IS NOT CAPABLE OF TWO-SIDED PRINTING | F | F | T | F | F | F | F | F | F | F | T | F | F | F | F | F |
| 2 | 2 | OHP SHEET IS NOT CAPABLE OF PRINTING IN A5 SIZE | F | F | T | F | F | T | F | F | F | F | F | F | F | F | F | F |
| 3 | 2 | A5 SIZE SHEET IS NOT CAPABLE OF STAPLING AT UPPER LEFT | F | F | F | F | F | T | T | F | F | F | F | F | F | F | F | F |
| 4 | 2 | A5 SIZE SHEET IS NOT CAPABLE OF STAPLING AT LOWER LEFT | F | F | F | F | F | T | F | T | F | F | F | F | F | F | F | F |
| 5 | 2 | A5 SIZE SHEET IS NOT CAPABLE OF STAPLING AT LOWER RIGHT | F | F | F | F | F | T | F | F | T | F | F | F | F | F | F | F |
| 6 | 2 | A5 SIZE SHEET IS NOT CAPABLE OF STAPLING AT UPPER RIGHT | F | F | F | F | F | T | F | F | F | T | F | F | F | F | F | F |
| 7 | 2 | COPY-FORGERY-INHIBITED PATTERN PRINTING IS NOT AVAILABLE AT HIGH RESOLUTION | F | F | F | F | F | F | F | F | F | F | F | F | F | T | T | F |
| 8 | 2 | STAMP PRINTING IS NOT AVAILABLE AT HIGH RESOLUTION | F | F | F | F | F | F | F | F | F | F | F | F | F | T | F | T |

FIG.8

| | A | B | C | D | E | F | G | H |
|---|---|---|---|---|---|---|---|---|
| 1 | SETTING TYPE | SHEET TYPE | SHEET SIZE | STAPLING | TWO-SIDED PRINTING | RESOLUTION | COPY-FORGERY-INHIBITED PATTERN PRINTING | STAMP PRINTING |
| 2 | | IPP | IPP | IPP | IPP | IPP | VENDOR-SPECIFIC | VENDOR-SPECIFIC |
| 3 | PRINTER SETTING PRIORITY | NO | NO | NO | NO | NO | NO | YES |

FIG.9A

Case1

| | A | B | C | D | E | F | G | H |
|---|---|---|---|---|---|---|---|---|
| | | SHEET TYPE | SHEET SIZE | STAPLING | TWO-SIDED PRINTING | RESOLUTION | COPY-FORGERY-INHIBITED PATTERN PRINTING | STAMP PRINTING |
| 2 | PRINTER SETTING | PLAIN PAPER | A4 | OFF | OFF | MEDIUM | OFF | OFF |
| 3 | JOB SETTING | PLAIN PAPER | A4 | OFF | OFF | LOW | — | — |
| 4 | JOB SETTING TO BE REFLECTED ON PRINT PROCESSING | PLAIN PAPER | A4 | OFF | OFF | LOW | OFF | OFF |
| 5 | PROHIBITION VALIDATION RESULT | F | F | F | F | F | F | F |

FIG.9B

Case2

| | A | B | C | D | E | F | G | H |
|---|---|---|---|---|---|---|---|---|
| 1 | | SHEET TYPE | SHEET SIZE | STAPLING | TWO-SIDED PRINTING | RESOLUTION | COPY-FORGERY-INHIBITED PATTERN PRINTING | STAMP PRINTING |
| 2 | PRINTER SETTING | PLAIN PAPER | A4 | OFF | OFF | MEDIUM | OFF | ON |
| 3 | JOB SETTING | OHP | A4 | OFF | ON | LOW | — | — |
| 4 | JOB SETTING TO BE REFLECTED ON PRINT PROCESSING | OHP | A4 | OFF | ON | LOW | OFF | ON |
| 5 | PROHIBITION VALIDATION RESULT | T | F | F | T | F | F | F |

FIG.9C

Case3

| | A | B | C | D | E | F | G | H |
|---|---|---|---|---|---|---|---|---|
| 1 | | SHEET TYPE | SHEET SIZE | STAPLING | TWO-SIDED PRINTING | RESOLUTION | COPY-FORGERY-INHIBITED PATTERN PRINTING | STAMP PRINTING |
| 2 | PRINTER SETTING | PLAIN PAPER | A4 | OFF | OFF | MEDIUM | ON | OFF |
| 3 | JOB SETTING | PLAIN PAPER | A4 | OFF | OFF | HIGH | — | — |
| 4 | JOB SETTING TO BE REFLECTED ON PRINT PROCESSING | PLAIN PAPER | A4 | OFF | OFF | HIGH | ON | OFF |
| 5 | PROHIBITION VALIDATION RESULT | F | F | F | F | T | T | F |

FIG.9D

Case4

| | A | B | C | D | E | F | G | H |
|---|---|---|---|---|---|---|---|---|
| 1 | | SHEET TYPE | SHEET SIZE | STAPLING | TWO-SIDED PRINTING | RESOLUTION | COPY-FORGERY-INHIBITED PATTERN PRINTING | STAMP PRINTING |
| 2 | PRINTER SETTING | PLAIN PAPER | A4 | OFF | OFF | MEDIUM | OFF | ON |
| 3 | JOB SETTING | PLAIN PAPER | A4 | OFF | OFF | HIGH | — | — |
| 4 | JOB SETTING TO BE REFLECTED ON PRINT PROCESSING | PLAIN PAPER | A4 | OFF | OFF | HIGH | OFF | ON |
| 5 | PROHIBITION VALIDATION RESULT | F | F | F | F | T | F | T |

FIG.11A-1

Case2

```
| CANCEL          (PRINT) |— 1101
| PRINTER    Printer(1) > |
| NUMBER OF COPIES      1 |      1110
| OPTIONS               ∨ |
|    SHEET SIZE        A4 |
|    SHEET TYPE       OHP |
|    STAPLING         OFF |
|    TWO-SIDED PRINTING ON|
|    RESOLUTION       LOW |
```

FIG.11A-2

```
| CANCEL            PRINT |
| PRINTER    Printer(1) > |
| NUMBER OF COPIES      1 |
| OPTIONS               ∨ |— 1111
| SHEET SIZE           A4 |
|⚠ SHEET TYPE        OHP |— 1112
|   STAPLING          OFF |
|⚠ TWO-SIDED PRINTING ON |— 1113
|   RESOLUTION        LOW |
| MESSAGE: OHP AND TWO-SIDED |— 1114
| PRINTING CANNOT BE COMBINED|
```

FIG.11B-1

Case3

```
| CANCEL            PRINT |
| PRINTER    Printer(1) > |
| NUMBER OF COPIES      1 |— 1120
| OPTIONS               ∨ |
|    SHEET SIZE        A4 |
|    SHEET TYPE PLAIN PAPER|
|    STAPLING         OFF |
|    TWO-SIDED PRINTING OFF|
|    RESOLUTION      HIGH |
```

FIG.11B-2

```
| CANCEL            PRINT |
| PRINTER    Printer(1) > |
| NUMBER OF COPIES      1 |
| OPTIONS               ∨ |— 1121
|    SHEET SIZE        A4 |
|    SHEET TYPE PLAIN PAPER|
|    STAPLING         OFF |
|    TWO-SIDED PRINTING ON |
|⚠ RESOLUTION      MEDIUM|— 1122
| MESSAGE: SETTING IS CHANGED |— 1124
| BASED ON RESTRICTION        |
```
1123

Case4

| CANCEL | PRINT |
|---|---|
| PRINTER | Printer(1) > |
| NUMBER OF COPIES | 1 |
| OPTIONS | ⌄ |
| SHEET SIZE | A4 |
| SHEET TYPE | PLAIN PAPER |
| STAPLING | OFF |
| TWO-SIDED PRINTING | OFF |
| RESOLUTION | HIGH |

| CANCEL | PRINT |
|---|---|
| PRINTER | Printer(1) > |
| NUMBER OF COPIES | 1 |
| OPTIONS | ⌄ |
| SHEET SIZE | A4 |
| SHEET TYPE | PLAIN PAPER |
| STAPLING | OFF |
| TWO-SIDED PRINTING | ON |
| RESOLUTION | HIGH |
| 1131 — MESSAGE: SOME OF PRINTER SETTINGS MAY NOT BE REFLECTED | |

PRINTING APPARATUS, CONTROL METHOD, AND STORAGE MEDIUM FOR PROCESSING PRINT SETTINGS

BACKGROUND

Field of the Invention

The present disclosure relates to a printing apparatus for processing a print job.

Description of the Related Art

A printing apparatus that receives print data from a communication terminal via a network and forms an image on a sheet based on the received print data is known. Generating print data to be transmitted to a printing apparatus by using a printer driver (or print application) designed to use each individual printing apparatuses is also known.

Generating print data without intervention of a printer driver (or print application) designed to use each individual printing apparatus is also known. Japanese Patent Application Laid-Open No. 2017-113904 discusses a print client that performs printing based on a network protocol (Internet Printing Protocol (IPP)) for causing a printing apparatus to execute printing. The print client discussed in Japanese Patent Application Laid-Open No. 2017-113904 executes print processing by performing communication between the printing apparatus and a communication terminal based on an IPP communication procedure.

Print servers and information processing apparatuses for providing general-purpose print services compliant with the IPP standard are expected to be able to deal with various types of printing apparatuses. Functions, specifications, and prohibition conditions that are different from one printing apparatus to another are therefore unable to be stored inside, and need to be obtained from the printing apparatuses or make inquiry to the printing apparatuses. Request for Comments (RFC) 2911 Section 3.2.3 Validate-Job Operation [searched on Aug. 3, 2018] (http://tools.ietf.org/html/rfc2911) discusses a unit that, if a Validate-Job operation is issued in IPP printing, returns unsupported attributes of the job without inputting the job.

A printer driver for a typical printing apparatus provides a plurality of setting items, including sheet type options, image quality settings, and finishing processing options. A plurality of functions is not always simultaneously usable and depends on the settings of the respective functions. Such combinations of settings are usually referred to as "prohibition conditions", and the unspecifiable combinations are fed back to the user. A printing apparatus sometimes has default print settings (print settings to be used by default) as operation mode settings of the printing apparatus. Whether a job can be executed has conventionally been validated based only on the setting values included in the job. In such a case, whether a job with an appropriate combination of setting values can be executed is unknown if the default print settings are combined with the setting values of the job. Depending on how the default print settings of the printing apparatus are made, printing based on a print job may fail even if the print job is determined to be executable by advance validation based on its setting values.

SUMMARY OF THE INVENTION

According to an aspect of the present disclosure, a printing apparatus is provided and includes a storage unit configured to store setting information about a print operation, a reception unit configured to receive a print setting value to be used in processing print data from a communication terminal, a determination unit configured to determine whether the print setting value received by the reception unit conflicts with the setting information stored in the storage unit, and a notification unit configured to notify the communication terminal of information indicating a determination result by the determination unit, wherein the reception unit is configured to receive the print data after the notification by the notification unit.

Further features will become apparent from the following description of exemplary embodiments with reference to the attached drawings.

BRIEF DESCRIPTION OF THE DRAWINGS

FIG. 1 is a schematic diagram illustrating an example of a printing system.

FIG. 4 is a block diagram illustrating an example of a hardware configuration of a communication terminal.

FIGS. 6A and 6B are a diagram illustrating an example of a request and examples of responses according to the Internet Printing Protocol (IPP).

FIG. 7 is a table illustrating examples of prohibition conditions.

FIG. 8 is a table illustrating examples of printer settings of the printing apparatus.

FIGS. 9A, 9B, 9C, and 9D are tables illustrating prohibition conditions based on job setting values and printer settings.

FIGS. 11A-1, 11A-2, 11B-1, 11B-2, 11C-1, and 11C-2 illustrate examples of a screen displayed on an operation unit of the communication terminal.

DESCRIPTION OF THE EMBODIMENTS

Figure 2:
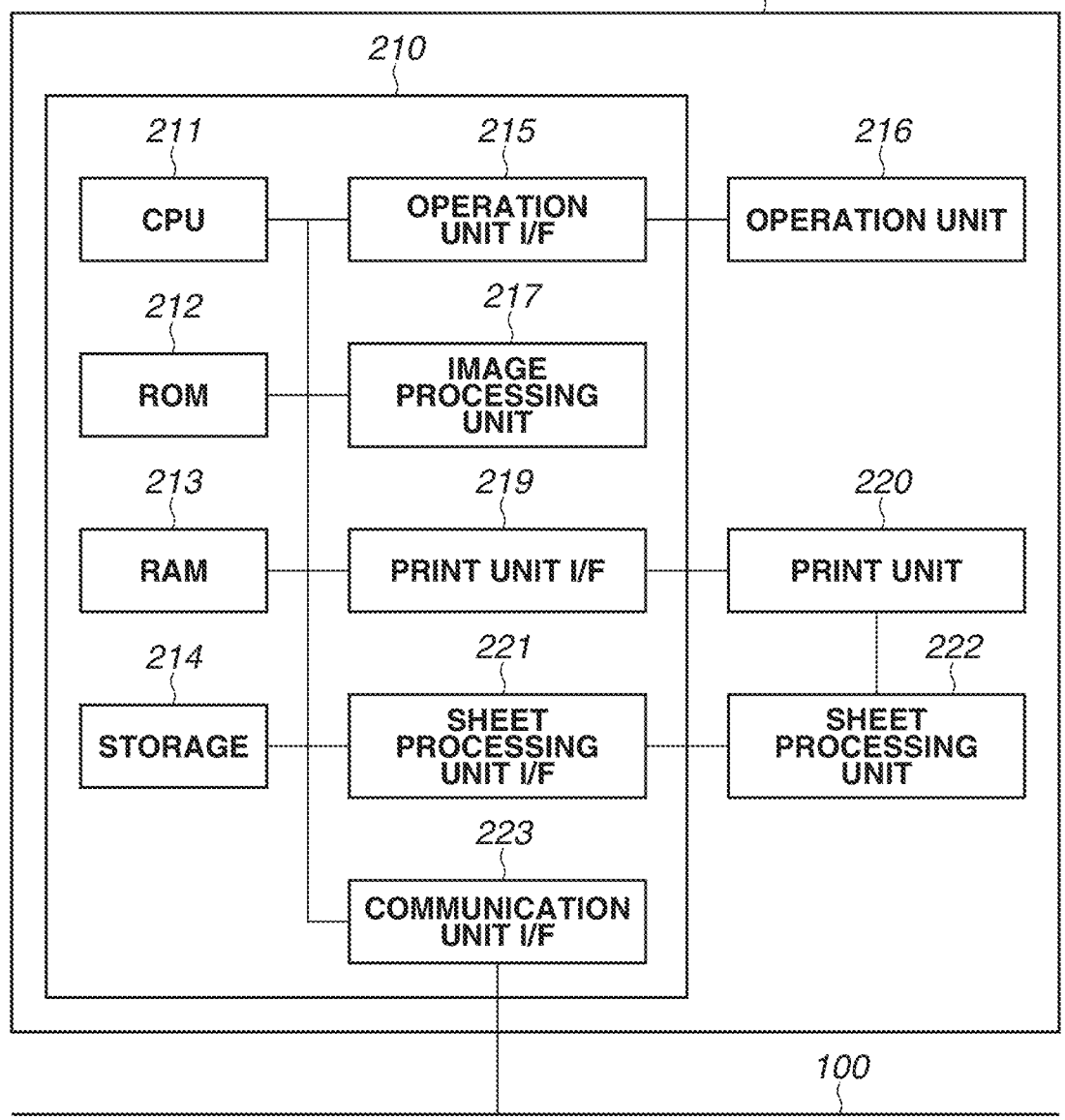
FIG. 2 is a block diagram illustrating an example of a hardware configuration of a printing apparatus.

Exemplary embodiments will be described below with reference to the drawings. The following exemplary embodiments are not intended to limit the disclosure set forth in the claims, and not all combinations of features described in the exemplary embodiments are necessarily required.

First, a configuration of a printing system according to a first exemplary embodiment will be described with reference to FIG. 1. The printing system according to the present exemplary embodiment includes communication terminals 103 and 104, a printing apparatus 101, and an access point (AP) 102. The printing apparatus 101 and the AP 102 are connected on a network 100 to be communicable with each other. In the present exemplary embodiment, the printing apparatus 101 is described as an example of a printing apparatus. The communication terminals 103 and 104 are described as examples of a communication terminal. A case where the communication terminal 103 is a portable terminal such as a tablet terminal, and the communication terminal 104 is a portable terminal such as a smart phone, will be described as an example.

The communication terminals 103 and 104 can communicate with the printing apparatus 101 on the network 100 via the AP 102. In the present exemplary embodiment, the above-described configuration is employed as an example of a printing system. However, it is not limited thereto. It is only necessary that a printing apparatus is communicably connected with one or more communication terminals via a network. Examples of the communication via the AP 102 include wireless communication compliant with the Institute of Electrical and Electronics Engineers (IEEE) 802.11 series. The communication terminal 103 and the printing apparatus 101 can also communicate with each other by direct wireless communication via an ad-hoc network, such as Wi-Fi Direct® and Wi-Fi Aware®.

First, the printing apparatus 101 will be described. The printing apparatus 101 can perform print processing based on a print job received from an external apparatus via the network 100. The printing apparatus 101 according to the present exemplary embodiment can receive and print a print job compliant with the Internet Printing Protocol (IPP).

<Configuration of Printing Apparatus>

FIG. 2 is a block diagram illustrating a hardware configuration of the printing apparatus 101. In the present exemplary embodiment, the printing apparatus 101 will be described as an example of a print control apparatus. However, it is not limited thereto. For example, the print control apparatus may be the one having a function of reading a document in addition to a print function, such as a multifunction peripheral (MFP).

A control unit 210 including a central processing unit (CPU) 211 controls operation of the entire printing apparatus 101. The CPU 211 reads a control program stored in a read-only memory (ROM) 212 or a storage 214, and performs various controls such as a print control and read control. The ROM 212 stores control programs executable by the CPU 211. A random access memory (RAM) 213 is a main storage memory for the CPU 211 and is used as a working area or a temporary storage area for loading various control programs. The storage 214 stores print job data, image data, various programs, and various types of setting information. Data on a print job to be temporarily stored by a reservation printing function is stored in the storage 214. In the present exemplary embodiment, the storage 214 is assumed to be an auxiliary storage device such as a hard disk drive (HDD). A nonvolatile memory such as a solid state drive (SSD) may be used instead of the HDD. Such pieces of hardware including the CPU 211, the ROM 212, the RAM 213, and the storage 214 constitute a computer.

In the printing apparatus 101 according to the present exemplary embodiment, the single CPU 211 performs processes illustrated in a flowchart to be described below by using a single memory (RAM 213). However, other configurations may be employed. For example, the processes illustrated in the flowchart to be described below may be performed by cooperation of a plurality of CPUs, RAMs, ROMs, and storages. Further, some of the processes may be performed by using a hardware circuit such as an application specific integrated circuit (ASIC) and a field programmable gate array (FPGA).

An operation unit interface (I/F) 215 connects an operation unit 216 and the control unit 210. The operation unit 216 includes a liquid crystal display unit having a touch panel function and various hardware keys. The operation unit 216 functions as a display unit for displaying information and an acceptance unit for accepting user instructions.

An image processing unit 217 has a raster image processor (RIP) function for rendering a print job to generate a print image used for printing. The image processing unit 217 can also perform resolution conversion and correction processing on image data. In the present exemplary embodiment, the image processing unit 217 is assumed to be implemented by a hardware circuit (such as ASIC and FPGA). However, it is not limited thereto. For example, the printing apparatus 101 may further include a processor intended for image processing applications, and the processor may implement image processing and print data rendering processing by executing an image processing program. In such a case, the processor and the CPU 211 cooperate to implement processing corresponding to the flowchart to be described below. The CPU 211 may be configured to execute a program for performing image processing, and thereby perform the image processing and print data rendering processing. The image processing may be performed by any combination of these.

A print unit I/F 219 connects a print unit 220 and the control unit 210. The print image generated by the image processing unit 217 analyzing print data is transferred from the control unit 210 to the print unit 220 via the print unit I/F 219. The print unit 220 receives a control command and the print image via the control unit 210, and prints an image on a sheet fed from a sheet feed cassette (not illustrated) based on the print image. The printing method of the print unit 220 may be an electrophotographic printing method or an inkjet printing method. Other printing methods such as a thermal transfer method may also be employed. A sheet processing unit I/F 221 connects the control unit 210 and a sheet processing unit 222. The sheet processing unit 222 receives a control command from the CPU 211, and applies post-processing to the sheet printed by the print unit 220 based on the control command. For example, the sheet processing unit 222 performs post-processing such as aligning a plurality of sheets, punching a hole in a sheet, and binding a plurality of sheets. The control unit 210 is connected to the network 100 via a communication unit I/F 223. The communication unit I/F 223 transmits capability information and status information to the communication terminals 103 and 104 on the network 100, and receives a print job from the communication terminals 103 and 104 on the network 100.

In performing printing compliant with the IPP specifications, validation of job settings is requested (Validate-Job request to be described below) before the print job is input.

Whether a job can be executed has conventionally been validated based only on the setting values included in the job. There has thus been an issue that whether a job including an appropriate combination of setting values can be executed is unknown if default print settings (print settings to be used by default) as an operation mode of the printer are combined with the setting values of the job. Depending on how the default print settings of the printing apparatus 101 are made, printing based on a print job may fail even if the print job is determined to be executable by advance Validate-Job based validation.

In view of the above-described issue, the present exemplary embodiment provides a function capable of determining whether a job can be executed based on both setting information indicating operation settings of the printing apparatus 101 and the setting values of the job, and notifying a more appropriate determination result. A specific implementation method will be described below.

Figure 3:
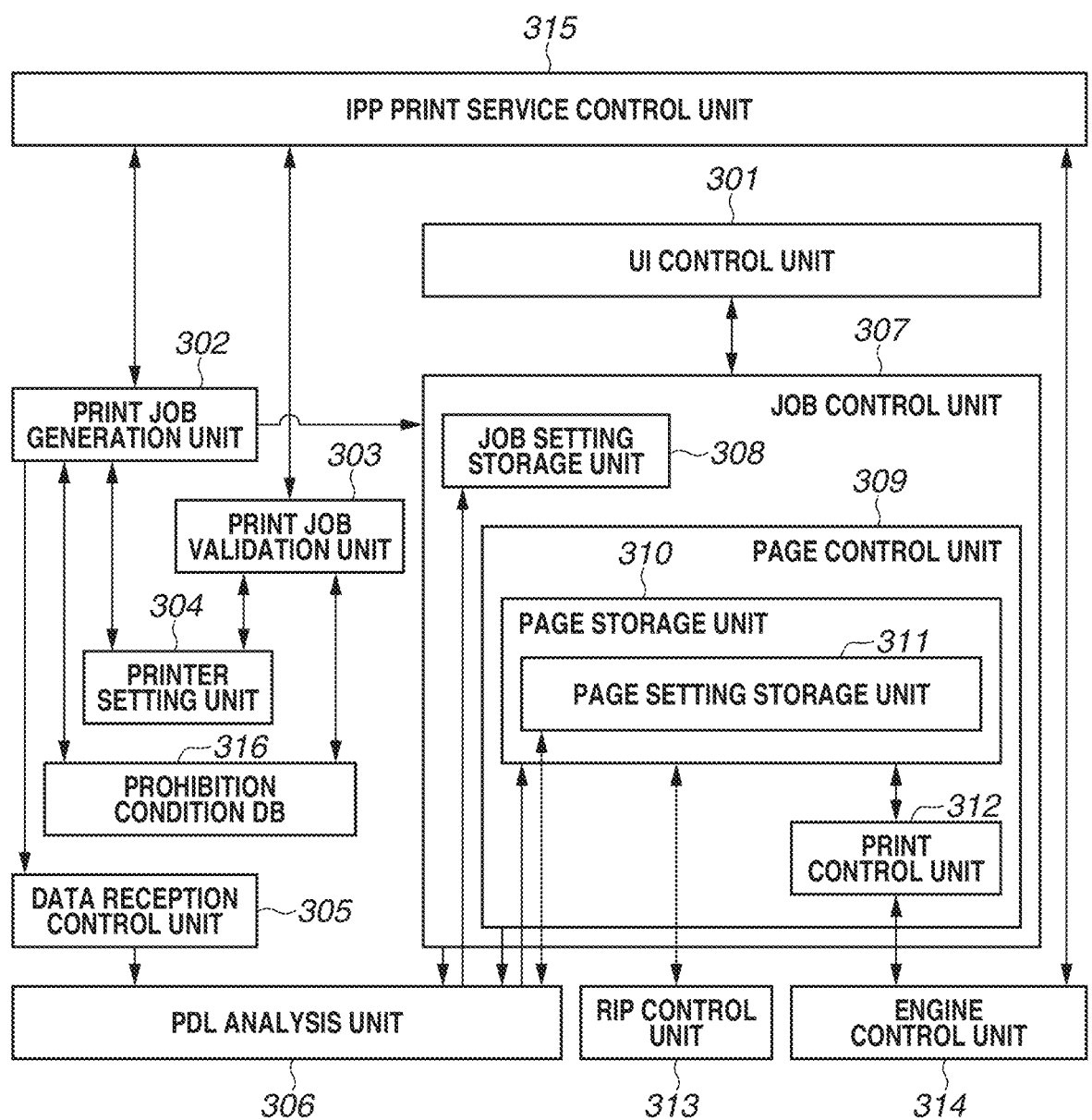
FIG. 3 is a block diagram illustrating an example of a software configuration of the printing apparatus.

FIG. 3 is a block diagram illustrating an example of a software configuration of the printing apparatus 101. The functional blocks illustrated in FIG. 3 are implemented by the CPU 211 executing programs loaded into the RAM 213.

An IPP print service control unit 315 is a service that controls communications with the communication terminals 103 and 104 in performing IPP-related printing. The IPP print service control unit 315 has a function of receiving an inquiry about printing and notifying attribute information indicating capabilities of the printing apparatus 101. The attribute information includes information such as data formats and print job settings that the printing apparatus 101 can accept. The print job settings include usable sheet sizes and sheet types, a color or monochrome print mode, settings about print layout such as one-sided/two-sided printing and N-up, and settings about post-processing. If the IPP print service control unit 315 receives a validation request for the executability of a print job from the communication terminals 103 and 104, the IPP print service control unit 315 determines whether a prohibition condition applies to the execution of the print job in cooperation with a print job validation unit 303. The determination result is notified to the communication terminals 103 and 104. The print job validation unit 303 obtains printer setting values from a printer setting unit 304 in addition to received print setting information, and validates whether the print job can be executed based on both the settings. Default print settings (print settings to be used by default) that are operation mode settings about a print operation of the printing apparatus 101 are stored in the printer setting unit 304 in advance by a user such as an administrator. Hereinafter, the default print settings (print settings to be used by default), which are the operation mode settings of the printing apparatus 101, will be referred to simply as printer settings.

The print job validation unit 303 obtains prohibition conditions from a prohibition condition database (DB) 316 in which prohibition rules on combinations of two or more print settings are described. The print job validation unit 303 then validates a print job by using the setting values of the print job, the print settings included in the printer settings, and the obtained prohibition conditions. If, as a result of the validation, none of the prohibition conditions applies to the print job and the print job is determined to be printable, the print job validation unit 303 notifies the validation-requesting communication terminal of "printable" via the IPP print service control unit 315. On the other hand, if any prohibition condition applies to the print job and the print job is determined not to be printable, the print job validation unit 303 notifies the validation-requesting communication terminal of "not printable". Depending on the validation result, the print job validation unit 303 may notify "conditionally printable". Details of such processing will be described below with reference to the flowchart of FIG. 10.

If the communication terminals 103 and 104 are notified of "printable" as a response to such a validation, the communication terminals 103 and 104 generate a print job and transmit the print job to the printing apparatus 101. The reception of a print job will be described. If the IPP print service control unit 315 receives an IPP print job from a communication terminal, the IPP print service control unit 315 passes the received data to a print job generation unit 302.

The print job generation unit 302 receives the print job from the communication terminal via the IPP print service control unit 315, writes drawing data to a data reception control unit 305, registers the print job in a job control unit 307 as a new job, and issues a request to start print processing. The print job generation unit 302 further obtains print settings to be applied to the print job from the printer setting unit 304, and passes the print settings to a job setting storage unit 308.

A user interface (UI) control unit 301 obtains information about a state of the print job in process from the job control unit 307, and displays a UI screen displaying a processing status of the print job on the operation unit 216. The UI control unit 301 can also display a setting change UI screen for changing the settings of the printer setting values on the operation unit 216. The settings changed by operations via the setting change UI screen are stored into the printer setting unit 304.

The data reception control unit 305 is a reception buffer area for the print job received by the print job generation unit 302. The data reception control unit 305 temporarily stores the print job in the storage 214. If the job control unit 307 instructs a page description language (PDL) analysis unit 306 to perform PDL analysis processing on a print job, the PDL analysis unit 306 requests the corresponding print job of the data reception control unit 305. Upon receiving the request, the data reception control unit 305 passes data on the corresponding print job to the PDL analysis unit 306. The job control unit 307 instructs the PDL analysis unit 306 to analyze the print job. A page control unit 309 stores image data related to page data generated by the PDL analysis unit 306 into a page storage unit 310, and stores print settings on each page into a page setting storage unit 311.

The job setting storage unit 308 stores setting information on the print job. The setting information includes the "number of copies", "N-up (aggregate print)", "print side (one-sided/double-sided) setting", a "color/monochrome mode", and "finishing settings".

The page control unit 309 controls page analysis processing by the PDL analysis unit 306, RIP processing by a RIP control unit 313, and print control processing by a print control unit 312. The print control unit 312 obtains RIP-processed image data from the page storage unit 310, performs color separation of the image data into cyan, magenta, yellow, and black (CMYK) image data, and transmits the resulting CMYK image data to an engine control unit 314. The engine control unit 314 receives the separate pieces of CMYK image data from the print control unit 312 page by page, and controls the print unit 220 to perform print processing on each page.

<Configuration of Communication Terminals>

Next, a configuration of the communication terminals 103 and 104 will be described. The communication terminals 103 and 104 each include a print client compliant with the IPP, and can transmit a print job to a printer such as the printing apparatus 101. FIG. 4 is a block diagram illustrating an example of a hardware configuration of the communication terminals 103 and 104. Hereinafter, the communication terminal 103 will be representatively described. A control unit 400 including a CPU 401 controls operation of the entire communication terminal 103. The CPU 401 loads programs stored in a ROM 402 or a storage 404 into a RAM 403, and executes the programs to perform various controls including control of a print setting screen, generation of print data, and transfer of a print job. The ROM 402 stores control programs and a boot program executable by the CPU 401. The RAM 403 is a main storage memory for the CPU 401, and is used as a work area or a temporary storage area for loading various programs. The storage 404 stores an operating system (OS), the print client, print data generated by the print client, and various types of setting information. A communication unit I/F 405 is a network I/F that can transmit and receive data to/from the printing apparatus 101 on the network 100.

An operation unit 408 is connected to an operation unit I/F 407. The operation unit 408 is a touch panel functioning as a display unit for displaying a print setting screen provided by the print client and an acceptance unit for accepting user operations.

<Print Sequence>

Figure 5A:
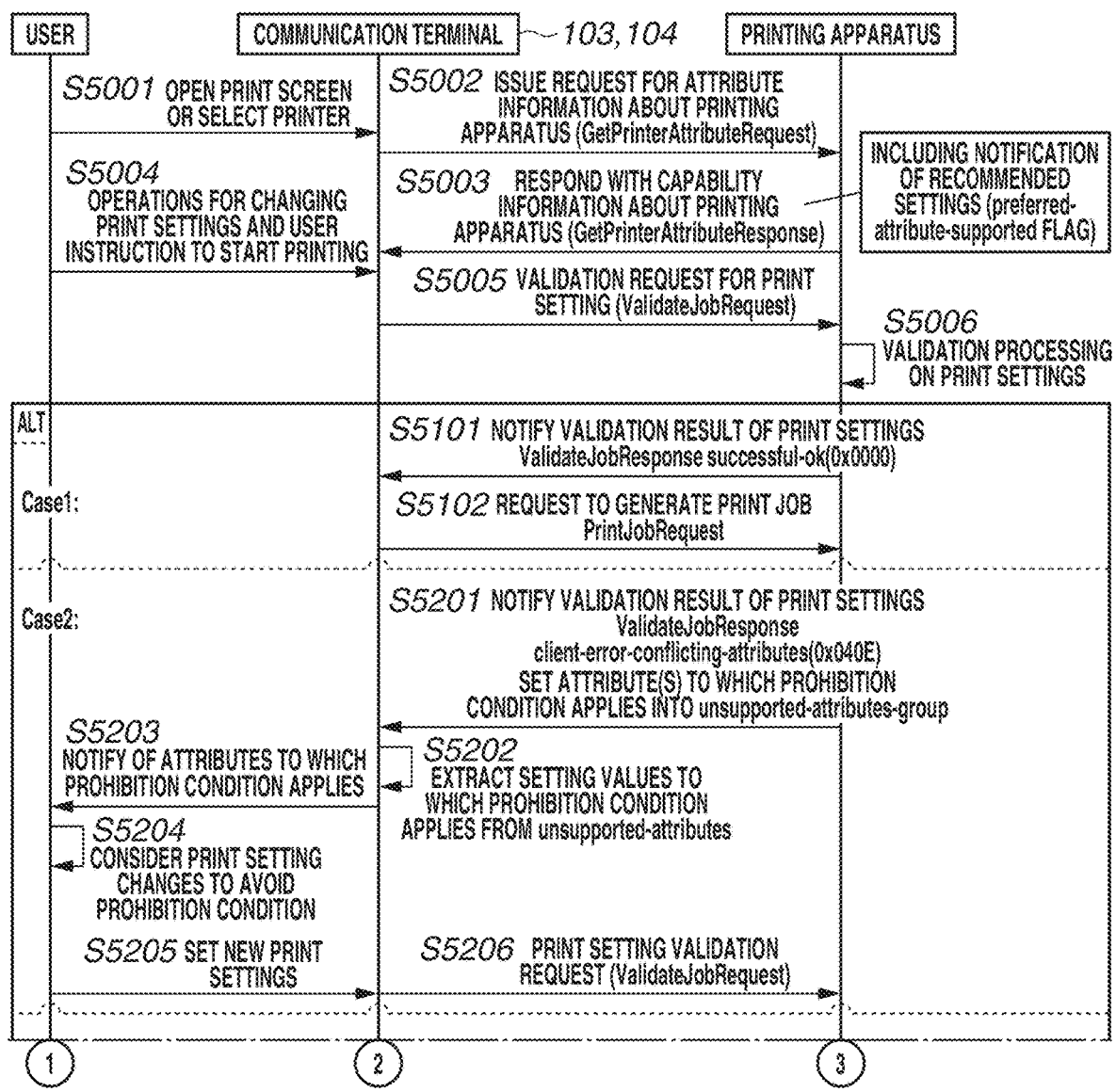
FIGS. 5A and 5B represent a sequence diagram illustrating an example of a processing procedure in the printing system.
Figure 5B:
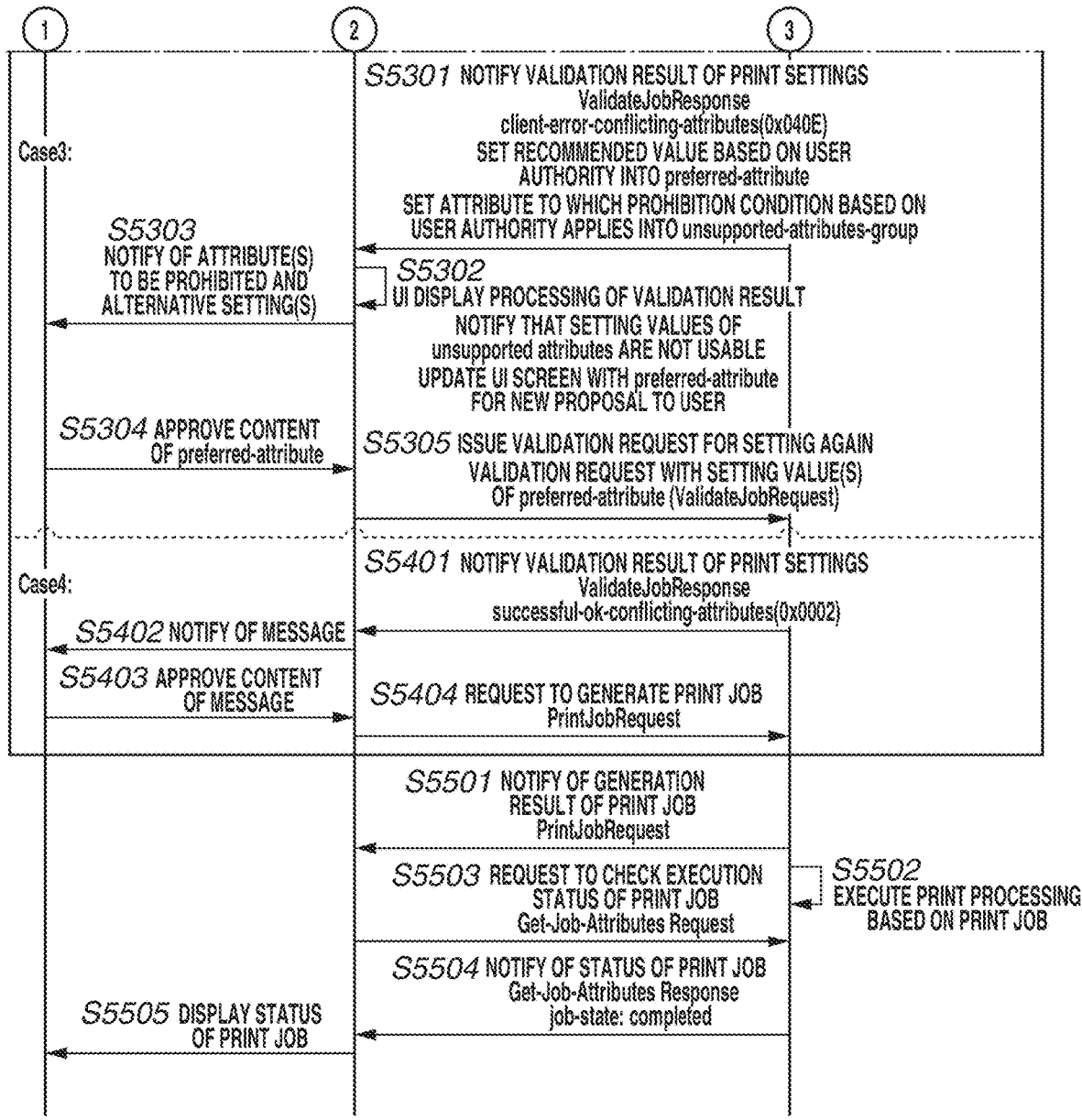

Next, an example of an IPP-compliant print sequence according to the present exemplary embodiment will be described with reference to FIGS. 5A, 5B, 6A, 6B, and 11A-1, 11A-2, 11B-1, 11B-2, 11C-1, and 11C-2. FIGS. 5A and 5B (hereinbelow, collectively referred to FIG. 5) are a sequence diagram illustrating the entire processing of the printing system according to the present exemplary embodiment when printing is performed by using a communication terminal and the printing apparatus 101. The processing includes validation of print settings and re-setting based on the validation result. In the present exemplary embodiment, a case where printing is performed by using the communication terminal 103 and the printing apparatus 101 will be described as an example. FIGS. 6A and 6B (hereinbelow, collectively referred to FIG. 6) are diagrams illustrating an example of a validation request and examples of attributes in the validation result. FIGS. 11A-1 to 11C-2 illustrate examples of an operation screen displayed on the communication terminal 103.

In step S5001, the user makes a user operation for opening a print screen of the print client on the communication terminal 103. Detecting the user operation, the communication terminal 103 transmits a search request for a printer search to printing apparatuses on the same network 100. The communication terminal 103 lists printing apparatuses responding to the search request as usable printers. For the purpose of description, a case where the printing apparatus 101 is included in the list and selected as the printer to be used will be described as an example.

If a printer is selected by the user, then in step S5002, the print client of the communication terminal 103 issues a request for attribute information about the printing apparatus 101 to the printer (printing apparatus 101) selected by the user operation for printing. More specifically, the print client issues an IPP Get-Printer-Attributes-Request operation. In step S5003, the printing apparatus 101 receiving the request issued in step S5002 responds with capability information about printing apparatus 101. More specifically, the printing apparatus 101 responds with Get-Printer-Attributes-Response. Here, the capability information notified by the printing apparatus 101 in step S5003 includes attribute information indicating printing capabilities of the printer (e.g., sheet sizes, sheet types, a color or monochrome print mode, settings about print layout such as one-sided/two-sided printing and N-up settings, and settings about post-processing). Attribute information "preferred-attribute-supported" indicating whether recommended settings can be notified of is also included. The attribute information "preferred-attribute-supported" includes alternative setting values that the printing apparatus 101 recommends to the print client.

Receiving the response in step S5003, the communication terminal 103 generates a print setting screen of the printing apparatus 101 based on the attribute information included in the received response, and displays the print setting screen on the operation unit 408.

In step S5004, the communication terminal 103 detects an operation for changing print settings via the print setting screen or a user instruction to start printing, and performs processing based on the user instruction. The communication terminal 103 accepts the operation for changing the print settings, and changes print setting values to be set into a print job. In step S5005, the communication terminal 103 detecting the user instruction to start printing transmits a validation request for the print settings. Before generating a print job, the communication terminal 103 generates a validation job including only the print settings to be set into the print job (including no print data), and requests the printing apparatus 101 to validate the print settings. More specifically, the communication terminal 103 transmits Validate-Job-Request. FIG. 6 illustrates an example of a message 6100 included in Validate-Job-Request. The message 6100 is an example of a message to be transmitted in a case where no prohibition occurs between the plurality of setting values to be set into the print job. More specifically, the message 6100 is an example of a validation request in a case where, as indicated by the reference numeral 6101, an overhead projector (OHP) sheet is selected as the sheet type to be included in the print settings, along with a print setting for one-sided printing.

In the present exemplary embodiment, a case where validation processing is performed after the acceptance of the user instruction to start printing is described as an example. However, it is not limited thereto. The validation processing may be performed each time the user changes an item on the print setting screen.

In step S5006, the printing apparatus 101 receiving the validation request from the communication terminal 103 validates whether the print settings requested in step S5005 are executable, based on the job setting values and the printer settings included in the validation job. The validation processing will be described with reference to a flowchart to be described below.

Depending on the validation result, four different sequences (case 1 to case 4) are then performed. First, case 1 will be described. Case 1 refers to a sequence (normal sequence) for situations where the validation result of step S5006 is OK (printable).

In step S5101, the printing apparatus 101 notifies the communication terminal 103 of "printable" as a response to the validation request in step S5005. FIG. 6 illustrates an example of a message 6200 indicating a response to the validation request. A "status-code" attribute 6201 contains a value indicating a success.

In step S5102, the communication terminal 103 receiving the response in step S5101 requests the printing apparatus 101 to generate a print job, and transmits print data to the printing apparatus 101. In such a case, the sequence proceeds to step S5501 without an interaction for waiting for user operations.

In step S5501, the printing apparatus 101 receiving the jog generation request and the print data notifies the communication terminal 103 of the completion of generation of the print job. In step S5502, the printing apparatus 101 executes print processing based on the received print job. In step S5503, after executing the print processing, the communication terminal 103 requests the printing apparatus 101 to check an execution status of the print job. In step S5504, if the print job is being printed, the printing apparatus 101 issues a notification of the status that printing is in process. If the print job is completed, the printing apparatus 101 issues a notification of the status that printing is completed. In step S5505, the communication terminal 103 displays the status of the print job notified from the printing apparatus 101 on-screen for user notification.

Next, case 2 will be described. Case 2 refers to an exception sequence occurring in situations where the validation result in step S5006 shows that a prohibition condition of the printing apparatus 101 applies to the print setting values, and notification of the setting items to be prohibited and re-setting of the setting items by the user are needed.

In this exception sequence, in step S5201, the printing apparatus 101 notifies the communication terminal 103 that printing is prohibited by a prohibition condition, and of the setting items to which the prohibition condition applies and the setting values thereof, as a response to the validation request transmitted in step S5005. FIG. 6 illustrates an example of a message 6300 indicating a response to a validation request transmitted in a state where the settings illustrated in FIG. 11A-1 are made as the print settings to be set to a print job. FIG. 11A-1 illustrates an example of the print setting screen displayed on the operation unit 408 of the communication terminal 103. An area 1110 represents an area for displaying and changing setting values. In the illustrated case, OHP sheets are selected as the sheet type and two-sided printing is set. OHP sheets are transparent sheets and have low visibility if two-sided printed. For such a reason, the printing apparatus 101 according to the present exemplary embodiment counts the combination of these settings as a prohibition condition (details will be described below). The printing apparatus 101 therefore responds with a validation result in which a "status-code" attribute 6301 contains a value indicating an error. The "status-code" attribute 6301 contains "client-error-conflicting-attributes" indicating the content of the error. An attribute 6302 contains information indicating the combination to which the prohibition condition applies.

In step S5202, the communication terminal 103 extracts information (prohibition information) about the setting items to which the prohibition condition applies based on the response result notified in step S5201. In step S5203, the communication terminal 103 notifies the user of the information by displaying the extracted prohibition information as a message. FIG. 11A-2 illustrates an example of the screen including the notification of the prohibition information, displayed on the operation unit 408. The communication terminal 103 displays display items 1112 and 1113 for drawing the user's attention, like warnings, in an area 1111 in association with the setting items related to the prohibition condition. The communication terminal 103 further displays a message 1114 about the prohibition condition. The mode of display of the message 1114 is not limited thereto. For example, the message 1114 may be displayed on a pop-up window.

In step S5204, the user considers print setting changes to avoid the prohibition condition of the printing apparatus 101 based on notifications such as the message 1114 displayed on the communication terminal 103. In step S5205, the user makes operations for setting changes. In step S5206, after accepting the setting changes, the communication terminal 103 detecting a user instruction to start printing issues a request to validate the print settings again based on the changed setting values. If the validation result is OK (i.e., printable), the sequence then proceeds to case 1. If the validation result is NG (i.e., not printable), the sequence proceeds to one of the exception sequences again.

Next, case 3 will be described. Case 3 is an exception sequence occurring in situations where the validation result in step S5006 indicates that a prohibition condition for giving priority to a printer setting applies thereto. Case 3 includes notification of a recommended setting and print processing based on the user's approval operation.

In this exception sequence, in step S5301, the printing apparatus 101 notifies the communication terminal 103 that printing is prohibited by a prohibition condition, and of the setting item to which the prohibition condition applies and the setting value thereof, as a response to the validation request transmitted in step S5005. The printing apparatus 101 further notifies the communication terminal 103 of a setting to be changed and a setting value thereof as a recommended setting.

Figures 1, 2, 11C:
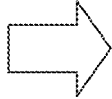

FIG. 6 illustrates an example of a message 6400 indicating a response to a validation request transmitted in a state where the settings illustrated in FIG. 11B-1 are made as the print settings to be set to a print job. FIG. 11B-1 illustrates an example of the print setting screen, where a resolution "high" is set in an area 1120. No prohibition condition applies between the setting values of the print job illustrated in FIG. 11B-1. However, if the printing apparatus 101 is given an operation setting to force stamp printing, a prohibition condition applies to the combination of the printer setting of the printing apparatus 101 and the resolution "high" of the print job. Accordingly, the printing apparatus 101 responds with a validation result including a value indicating an error in a "status-code" attribute 6401. The "status-code" attribute 6401 contains "client-error-conflicting-attributes" indicating the content of the error. Attributes 6402 and 6403 contain information about a recommended setting for removing the prohibition.

Referring back to FIG. 5, In step S5302, the communication terminal 103 generates a print screen in which setting items are changed based on recommended setting values included in the response result. FIG. 11B-2 illustrates an example of the screen in which a setting is changed to a recommended setting value, displayed on the operation unit 408. As illustrated in an area 1121, the communication terminal 103 changes a setting item 1123 to "medium". A display item 1122 for drawing the user's attention is also displayed in association with the setting item 1123. The communication terminal 103 further displays a message 1124 about the prohibition condition on the screen of FIG. 11B-2.

In step S5303, the user checks the screen to see that the setting item to which the prohibition condition applies needs to be changed. In step S5304, the user confirms the changed print screen, and approves the recommended setting by issuing a print instruction again. The method of approval is not limited thereto. For example, information indicating the content of the change and a popup window for allowing the user to select whether to approve the change may be displayed so that the change can be approved based on the selection. If the communication terminal 103 detects the approval of the recommended setting, then in step S5305, the communication terminal 103 issues a validation request for the print settings to the printing apparatus 101 again. If the validation result is OK (i.e., printable), the sequence proceeds to case 1. If the validation result is NG (i.e., not printable), the sequence proceeds to one of the exception sequences again.

Next, case 4 will be described. Case 4 is an exception sequence for control in situations where the validation result of step S5006 indicates that a prohibition condition applies thereto but printing can be executed by ignoring some of the print settings.

In step S5401, the printing apparatus 101 notifies the communication terminal 103 of "printable (but some of the settings are ignored)" as a response to the validation request in step S5005. FIG. 6 illustrates an example of a message 6500 indicating a response to a validation request transmitted in a state where the settings illustrated in FIG. 11C-1 are made as the print settings to be set to a print job. FIG. 11C-1 illustrates an example of the print setting screen, where a resolution "high" is set in the area 1120. No prohibition condition applies between the setting values of the print job illustrated in FIG. 11C-1. However, if the printing apparatus 101 is capable of copy-forgery-inhibited pattern printing and is given an operation setting to perform the copy-forgery-inhibited pattern printing, a prohibition condition applies to the combination of the printer setting of the printing apparatus 101 and the resolution "high" of the print job. The copy-forgery-inhibited pattern is an image including two parts. The first part includes smaller dots that will disappear when copied. The second part includes larger dots that will be reproduced when copied. And the first part and second part have substantially same density. As a result, the copy-forgery-inhibited pattern on a sheet hides a mark or letter such as confidential, but the hidden mark or letter will appear on a copy result of the sheet. The hidden mark or letter is a shape of the first part or second part. The copy-forgery-inhibited pattern printing will be briefly described. The copy-forgery-inhibited pattern printing is a function of embedding (combining) a character string to emerge when the original is copied in the background of the print product. The copy-forgery-inhibited pattern printing needs a large amount of memory. Without the copy-forgery-inhibited pattern printing, high-resolution printing desired by the user can be performed.

Therefore, the printing apparatus 101 responds with a validation result including a value indicating a success in a "status-code" attribute 6501. The "status-code" attribute 6501 contains "successful-ok-conflicting-attributes" indicating a conditional success.

In step S5402, the communication terminal 103 generates a print screen including a message to the user, and displays the print screen on the operation unit 408. FIG. 11C-2 illustrates an example of the print screen including the message, displayed on the operation unit 408. The communication terminal 103 displays a message 1131 relating to the prohibition condition. In this case, a message notifying the user that some of the settings may not be reflected is displayed. The user can send the print job by issuing a print instruction again. In steps S5403 and S5404, the communication terminal 103 detecting the instruction to start printing transmits a job generation request and print data to the printing apparatus 101. The rest of the processing is the same as that of the normal sequence case 1.

<Determination of Prohibition Conditions>

Next, prohibition processing by the printing apparatus 101 according to the present exemplary embodiment will be described.

FIG. 7 is a table illustrating the prohibition conditions described in the prohibition condition DB 316. Each line of this table (DB table) shows a prohibition condition. In fact, the printing apparatus 101 has various other prohibition conditions, whereas FIG. 7 representatively illustrates eight prohibition conditions for the sake of description. The prohibition conditions are uniquely identified by management numbers in column A. Column B indicates the numbers of prohibition items. For example, the prohibition condition of management number 1 includes two prohibition items. Sheet type OHP in column F and a two-sided printing function in column N are true, and the other functions are false. This indicates that the combination of an OHP sheet and two-sided printing constitutes a prohibition condition, under which the printing apparatus 101 is unable to perform processing. In FIG. 7, the number of prohibition items in each prohibition condition is two. However, a prohibition condition may include three or more prohibition items. Column C provides a description of the error when a print job is cancelled due to the prohibition condition. Columns D to S list the print settings of the printing apparatus 101 in units of functions. Columns D to S express the combinations of prohibition items. Columns D to F represent sheet types, columns G to I sheet sizes, columns J to M stapling settings, column N a two-sided printing setting, columns O to Q resolution settings, column R a copy-forgery-inhibited pattern printing setting, and column S a stamp printing setting.

FIG. 8 is a table illustrating a relationship between a setting type of print setting that the printing apparatus 101 uses in printing and a priority of the printer setting. The setting type indicates whether the print setting is the one defined by the IPP (in the table, denoted as IPP) or the one originally defined by the printer vendor (in the table, denoted as vendor-specific). "IPP" represents a print setting that can be made on an IPP client. On the other hand, a vendor-specific setting is a print setting that is either not defined as an IPP print attribute or unable to be well expressed by an IPP print attribute. Such settings can be made in a default print mode of the printing apparatus 101 or a print mode forced by the printing apparatus 101. The printer setting priority field illustrated in the third row in FIG. 8 contains information indicating to which setting to give priority if the setting value of the print job and the setting value of the printer setting conflict. "NO" means to give priority to the print job, and "YES" to give priority to the printer settings. Since print job settings usually have priority over printer settings, the printer setting priority field is usually "NO".

Priority can sometimes be given to a printer setting over a job setting (print job setting). Examples thereof include when the print settings in using the printing apparatus 101 are to be forced without exception. The user such as an administrator can make a forcible print setting by changing the priority setting provided for each setting item included in the printer settings from no to YES via a not-illustrated setting screen.

In this case, the stamp printing setting in column H is set to YES by the user such as an administrator. With this setting made, a stamp image such as "confidential" can be combined and printed each time printing is performed based on a print job. As illustrated in FIG. 7, in the present exemplary embodiment, the combination of stamp printing and high resolution printing constitutes a prohibition condition.

Figure 10:
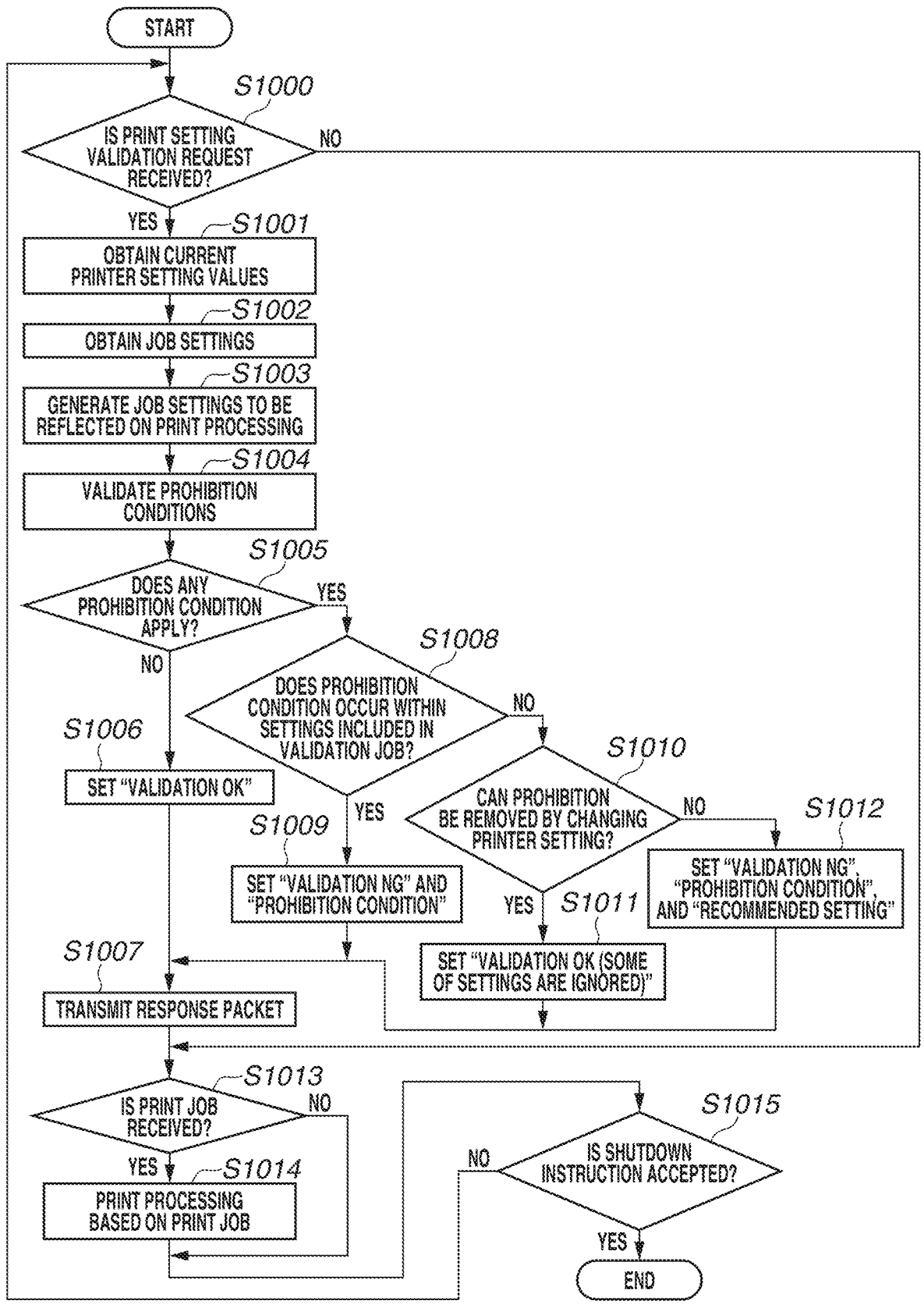
FIG. 10 is a flowchart illustrating an example of control of the printing apparatus.

A specific method for prohibition control will be described with reference to FIGS. 9A, 9B, 9C, 9D, and 10. FIGS. 9A to 9D illustrate examples of combinations of the setting values of a print job and the setting values of the printing apparatus 101. FIG. 10 is a flowchart illustrating control of the printing apparatus 101. The flowchart illustrated in FIG. 10 illustrates processing to be performed after the printing apparatus 101 is activated.

The operations (steps) illustrated in the flowchart of FIG. 10 are implemented by the CPU 211 reading programs for implementing the respective control modules, stored in the ROM 212 or the storage 214, into the RAM 213 and executing the programs. The processes illustrated in the flowchart are implemented by the CPU 211 executing the programs for implementing the control modules described with reference to FIG. 3. If a clear description of the control provided by each control module is intended, the control will be described with the control module implemented by the CPU 211 as the subject. Some of the processes are implemented by cooperation between the control modules implemented by the CPU 211 and various components such as the image processing unit 217 and the communication unit I/F 223.

In step S1000, the IPP print service control unit 315 determines whether a print setting validation request (Validate-Job) is received via the communication unit I/F 233. If a print setting validation request (Validate-Job) is received (YES in step S1000), the processing proceeds to step S1001. If not (NO in step S1000), the processing proceeds to step S1013. In step S1001, the IPP print service control unit 315 transmits the received print setting validation request to the print job validation unit 303. The print job validation unit 303 receives the print setting validation request (Validate-Job) from the communication terminal 103, and obtains the current printer setting values (printer settings) from the printer setting unit 304.

In step S1002, the print job validation unit 303 obtains the setting values of the print job (job settings) from the received print setting validation request.

In step S1003, the print job validation unit 303 generates job settings to be reflected on actual print processing based on the printer settings and the job settings. A specific method of reflection will be described by using the combination illustrated in FIG. 9A as an example. FIG. 9A illustrates a combination of settings corresponding to case 1 described in the sequence of FIG. 5. When generating job settings to be reflected on actual print processing in step S1003, the print job validation unit 303 determines which to give priority, the setting values of the print job or the printer settings of the printing apparatus 101, based on the settings in the third row of FIG. 8 described above. For example, for the print settings in columns B to G of FIG. 9A, the job settings are given priority since the printer setting priority is "NO". For the print setting in column H, the printer setting is given priority since the printer setting priority is "YES". Consequently, the job settings to be reflected on the print processing in FIG. 9A include the values of the job settings in columns B to F and the printer setting value in column H. In column G, the printer setting priority is "NO", and the job setting is given priority. However, the printer setting is reflected in this case since the setting about the copy-forgery-inhibited pattern printing is unable to be made by IPP printing.

In step S1004, the print job validation unit 303 validates whether any prohibition condition applies to the generated job settings to be reflected on the print processing. The print job validation unit 303 performs the validation with the prohibition conditions by using the prohibition condition DB 316.

In step S1005, the print job validation unit 303 determines whether any prohibition condition applies thereto based on the result of validation in step S1004. If none of the prohibition conditions applies thereto (NO in step S1005), the processing proceeds to step S1006. If any one or more of the prohibition conditions apply (YES in step S1005), the processing proceeds to step S1008.

Specific examples of the validation of the prohibition conditions will be described with reference to FIG. 9A corresponding to case 1 and FIG. 9B corresponding to case 2. Case 1 in which no prohibition condition applies will initially be described. The fifth row of FIG. 9A shows validation results for respective prohibition items. If a validation request corresponding to case 1 is accepted, all the prohibition items are determined to be false even when combined with the printer settings. As a result, no prohibition condition is determined to apply. Case 2 in which a prohibition condition applies will be described with reference to FIG. 9B. In FIG. 9B, the setting values of the print job to be reflected on the print processing include "two-sided printing" and sheet type "OHP". A prohibition condition is thus determined to apply.

In step S1006, the print job validation unit 303 generates a response packet indicating "validation ok". Specifically, the print job validation unit 303 sets "successful-ok" into a Validate-Job response.

In step S1007, the print job validation unit 303 transmits a generated response packet to the communication terminal 103 in cooperation with the IPP print service control unit 315. The response packet to be transmitted in step S1007 is the one generated in step S1006, S1009, S1011, or S1012, and includes a determination result (validation result) for the validation request. The determination result includes a success or failure of the validation, such as "successful" or "error". The determination result may also include detailed information about the success or failure, and if failure, clue information.

Next, control in a case where a prohibition condition is determined to apply will be described. In step S1008, the print job validation unit 303 determines whether the prohibition condition occurs within the settings included in the validation job received from the communication terminal 103 or from a combination with the printer settings. If the prohibition condition corresponds to the one occurring within the settings included in the validation job (YES in step S1008), the processing proceeds to step S1009. If not (NO in step S1008), the processing proceeds to step S1010.

In step S1009, the print job validation unit 303 generates a response packet including "validation NG" and the "prohibition condition". For example, in case 2 illustrated in FIG. 9B, the print job validation unit 303 sets client-error-conflicting-attributes into a Validate-Job response packet as illustrated in the message 6300 in FIG. 6. The print job validation unit 303 also sets the sheet type (OHP) and the two-sided printing to which the prohibition condition applies into unsupported-attribute. After the completion of the settings, the processing proceeds to step S1007.

In step S1010, the print job validation unit 303 determines whether the prohibition can be removed by changing a printer setting. More specifically, the print job validation unit 303 determines whether a printer setting to which the prohibition condition applies corresponds to the printer setting priority "YES". If the printer setting to which the prohibition condition applies corresponds to the printer setting priority "YES", the printer setting is not changeable. The prohibition is thus determined not to be removable by changing the printer setting (NO in step S1010), and the processing proceeds to step S1012. On the other hand, if the printer setting to which the prohibition condition applies corresponds to the printer setting priority "NO", printing can be executed by changing the printer setting. The prohibition is thus determined to be removable by changing the printer setting (YES in step S1010), and the processing proceeds to step S1011.

In step S1011, the print job validation unit 303 generates a response packet indicating "validation OK (some of the settings are ignored)". For example, in case 4 illustrated in FIG. 9D, the print job validation unit 303 sets successful-ok-conflicting-attributes into a Validate-Job response packet as illustrated in the message 6600 in FIG. 6.

As described above, if the prohibition condition relates to a print job setting (IPP setting) and a printer setting and the prohibition can be removed by changing the printer setting, the user does not need to change the print settings. Thus the print job validation unit 303 notifies the user of "validation OK (some of the settings are ignored)" to notify that printing can be executed without changing the user's settings.

In step S1012, the print job validation unit 303 generates a response packet indicating validation NG. For example, in case 3 illustrated in FIG. 9C, the print job validation unit 303 sets successful-ok-conflicting-attributes into a Validate-Job response packet as illustrated in the message 6400 of FIG. 6. The print job validation unit 303 also sets the resolution to which the prohibition condition applies into unsupported-attribute, and sets a recommended resolution into preferred-attribute. In such a manner, if the prohibition condition relates to a print job setting (IPP setting) and a printer setting (vendor-specific) and printing is unable to be executed unless the print job setting is changed, the print job validation unit 303 generates a response packet including the "prohibition condition" and the "recommended setting" to prompt the user to change the setting.

Next, processing for receiving a print job will be described. In step S1013, the CPU 211 determines whether a print job is received. If a print job is received (YES in step S1013), the processing proceeds to step S1014. If no print job is received (NO in step S1013), the processing proceeds to step S1015.

In step S1014, the CPU 211 performs PDL analysis processing, RIP processing, and RIP image print processing based on the print job in cooperation with various components, whereby an image is printed on a sheet. The CPU 211 also performs post-processing such as binding, folding, and punching on the image-printed sheet in cooperation with the sheet processing unit 222 if needed.

In step S1015, the CPU 211 determines whether a shutdown instruction is accepted. If a shutdown instruction is accepted (YES in step S1015), the series of processes ends. If no shutdown instruction is accepted (NO in step S1015), the processing returns to step S1000 to wait for a new validation request or print job.

By the processing described above, advance validation of print settings can be performed not only on the print settings included in a print job but also the print settings to be applied to the print job in consideration of the printer settings. If a prohibition condition applies thereto, information indicating the content of the prohibition condition and information needed to remove the prohibition can be appropriately notified.

Next, printing-related control of the communication terminal 103 will be described with reference to a flowchart of FIG. 12. The flowchart illustrated in FIG. 12 is performed in response to acceptance of a user operation for calling the print setting screen provided by the IPP print client.

Figure 12:
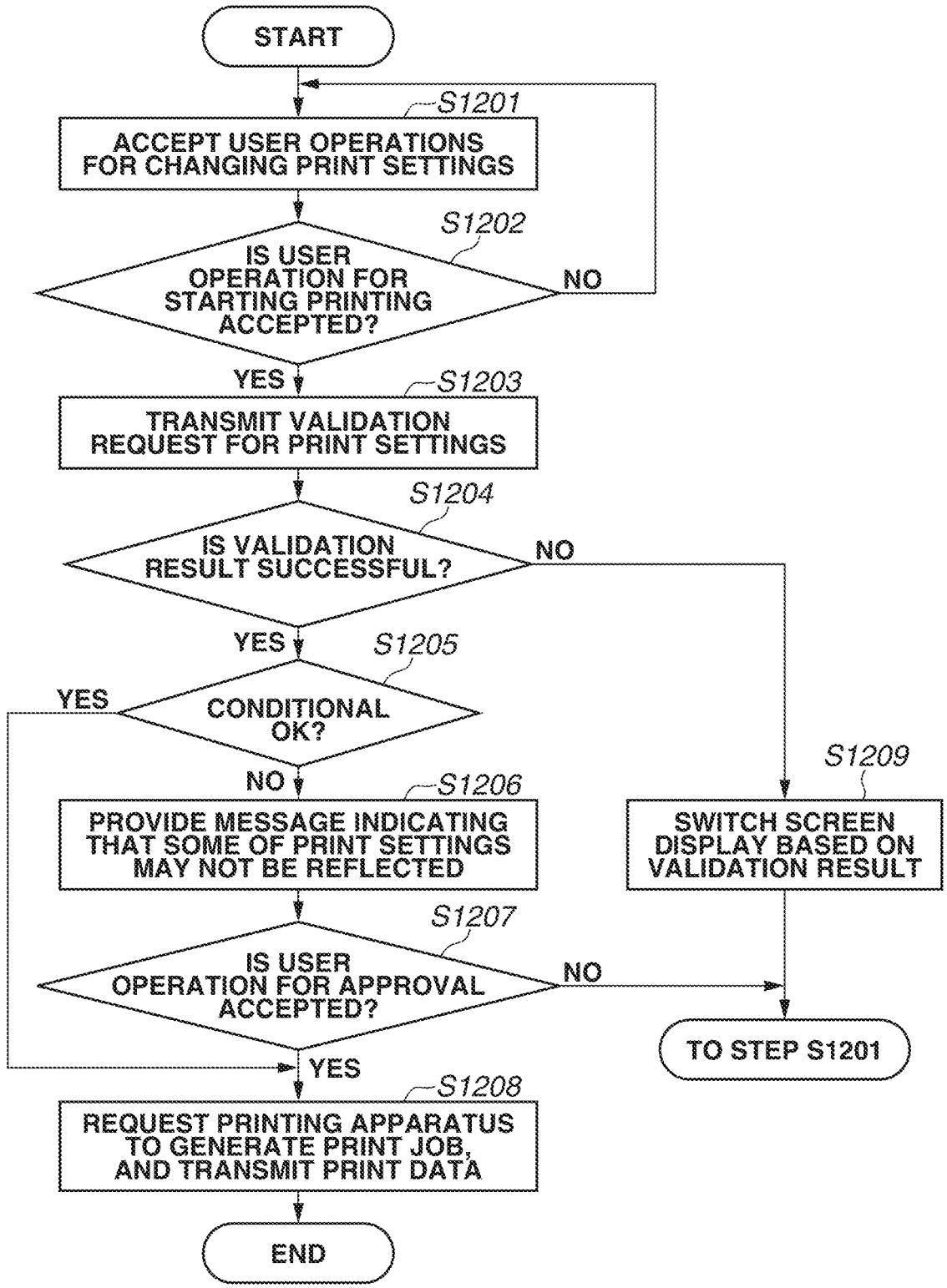
FIG. 12 is a flowchart illustrating an example of control of the communication terminal.

The operations (steps) illustrated in the flowchart of FIG. 12 are implemented by the CPU 401 reading programs for implementing the respective control modules, stored in the ROM 402 or the storage 404, into the RAM 403 and executing the programs.

In step S1201, the CPU 401 accepts user operations for changing print settings. In step S1202, the CPU 401 determines whether a user operation for starting printing is accepted. If a user operation for starting printing is accepted (YES in step S1202), the processing proceeds to step S1203. If no user operation for starting printing is accepted (NO in step S1202), the processing returns to step S1201. An example of the user operation for starting printing is the pressing of a print key 1101 illustrated in FIG. 11A-1. It is not limited thereto, and the communication terminal 103 may be configured so as to be able to perform a user operation for starting printing by voice.

In step S1203, the CPU 401 generates a validation request (Validate-Job request) for the print settings, and transmits the validation request to the printing apparatus 101. The validation request is generated based on the print settings to be applied to the print job, received in step S1201.

In step S1204, the CPU 401 determines whether a validation result received as a response to the validation request transmitted in step S1203 indicates a success (successful). If the validation result indicates a success (YES in step S1204), the processing proceeds to step S1205. If the validation result does not indicate a success (NO in step S1204), the processing proceeds to step S1209.

In step S1209, the CPU 401 switches the screen displayed on the operation unit 408 as appropriate based on the validation result. For example, if a validation result corresponding to case 2 of FIG. 6 is received, the CPU 401 displays a screen such as a screen illustrated in FIG. 11A-2. If a validation result corresponding to case 3 of FIG. 6 is received, the CPU 401 displays a screen such as a screen illustrated in FIG. 11B-2. In such a case, the print settings to be applied to the print job are also rewritten as appropriate so that the prohibition condition does not apply. After completion the switching of the screen display, the processing returns to step S1201. In step S1201, the CPU 401 waits for a new user operation relating to printing.

In step S1205, the CPU 401 determines whether the validation result received as a response to the validation request is conditional OK. If the validation result is conditional OK (YES in step S1205), the processing proceeds to step S1206. If the validation result is not conditional OK (NO in step S1205), the processing proceeds to step S1208. More specifically, if the status-code of the Validate-Job response is "successful-ok-conflicting-attributes" (0x0002), the processing proceeds to step S1206. If the status-code of the Validate-job response is "successful-ok", the processing proceeds to step S1208. The processing may also proceed to step S1206 if the state-code has other conditionally-printable values expressed by 0x0001 to 0x00FF other than "successful-ok" (0x0000).

In step S1206, the CPU 401 provides a message indicating that some of the print settings may not be reflected. More specifically, the CPU 401 displays the message 1131 of FIG. 11C-2. In step S1207, the CPU 401 determines whether a user operation for approval is accepted. If a user operation for approval is accepted (YES in step S1207), the processing proceeds to step S1208. If no user operation for approval is accepted (NO in step S1207), the processing returns to step S1201 to accept a new user operation related to printing. In the present exemplary embodiment, the print key 1101 is pressed again to make the user operation for approval. However, it is not limited thereto. A prompt screen including the message of step S1206 and alternatives whether to approve may be displayed to inquire of the user whether to approve.

In step S1208, the CPU 401 requests the printing apparatus 101 to generate a print job and transmits print data to the printing apparatus 101.

As described above, the communication terminal 103 can appropriately switch the screen display based on the validation result received from the printing apparatus 101 as a response to the validation request. The communication terminal 103 can thus appropriately notify the user of methods for removing prohibitions.

<Modifications>

In the above-described exemplary embodiment, a case where a Validate-Job operation is used to implement a validate request for print settings and a response thereto has been described. However, it is not limited thereto. For example, a validate request can be made by using Validate-Document or other methods.

In the above-described exemplary embodiment, the communication terminal 103 is described to determine the message (1114, 1124, or 1131) to be notified to the user based on the information included in the response to the validation request. However, it is not limited thereto. The printing apparatus 101 may embed a character string indicating the message content in the Validate-Job Response illustrated in FIG. 6. In this case, the communication terminal 103 may notify the user of the embedded character string as a message.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-151365, filed Aug. 10, 2018, which is hereby incorporated by reference herein in its entirety.

What is claimed is:

1. A printing apparatus comprising:
a storage configured to store a first print setting value as a print setting value which is used with a print setting value to be received from a communication terminal; and
one or more processors configured to:
receive, from the communication terminal, a request including one or more print setting values that include a second print setting value and do not include the first print setting value;
determine whether the second print setting value included in the request conflicts with the stored first print setting value;
notify the communication terminal of information based on a determination result by the determination;
receive, from the communication terminal that received the information, print data including one or more print setting values that do not include the second print setting value, wherein the one or more print setting values included in the print data were changed from the one or more print setting values included in the received request; and
execute a process based on the print data and the stored first print setting value.

2. The printing apparatus according to claim 1, wherein the one or more print setting values included in the print data were changed, based on a user instruction that the communication terminal has received, from the one or more print setting values included in the request.

3. The printing apparatus according to claim 1, wherein the print data includes image data to be printed.

4. The printing apparatus according to claim 1,
wherein the request including the second print setting value is an Internet Printing Protocol (IPP) Validate-Job request, and
wherein the determination result is notified to the communication terminal as a response to the Validate-Job request.

5. The printing apparatus according to claim 1,
wherein the first print setting value stored in the storage is a setting value about copy-forgery-inhibited pattern printing, and
wherein the one or more processors determine that the first print setting value and the second print setting value conflict with each other in a case where the second print setting value is a print setting value to perform printing at a predetermined resolution and the first print setting value indicates that the copy-forgery-inhibited pattern printing is enabled.

6. The printing apparatus according to claim 1, wherein the one or more processors transmit the information that includes the second print setting value to the communication terminal in a case where the determination result indicates that the first print setting value and the second print setting value conflict with each other.

7. The printing apparatus according to claim 6, wherein the information that includes the second print setting value includes a print setting value that is an alternative to the received second print setting value.

8. The printing apparatus according to claim 6, wherein the information that includes the second print setting value includes a character string expressing a message about the prohibition condition.

9. The printing apparatus according to claim 1, wherein, in a case where the stored first print setting value and the received second print setting value are determined to conflict with each other, the printing apparatus does not perform printing using both the first print setting value and the second print setting value.

10. The printing apparatus according to claim 1, wherein the one or more processors are further configured to:
receive another request including the one or more print setting values that do not include the second print setting value, wherein the one or more print setting values included in the print data were changed from the one or more print setting values included in the received request;

in a case where respective print setting values that are included in a value set that consists of the one or more print setting values included in said another request and the first print setting value do not conflict with one another, notify the communication terminal of another information; and receive, from the communication terminal, the print data including the one or more print setting values included in said another request.

11. The printing apparatus according to claim 1, wherein the one or more processors accept setting of the first print setting value that is to be stored into the storage.

12. The printing apparatus according to claim 1, wherein the first print setting value is a setting value of a setting item that is unable to be set on the communication terminal.

13. The printing apparatus according to claim 1, wherein the one or more processors are further configured to:
  receive the request before receiving print data from the communication terminal; and
  receive the print data from the communication terminal after the notification to the communication terminal.

14. The printing apparatus according to claim 13, wherein the second print setting value included in the request is a value set as a print setting value included in the print data to be received from the communication terminal.

15. The printing apparatus according to claim 1, wherein the stored first print setting value is used for, together with the print setting value received from the communication terminal, print processing based on the print data to be received from the communication terminal.

16. The printing apparatus according to claim 15, wherein the print processing includes post-processing.

17. The printing apparatus according to claim 1, wherein the first print setting value is to be used for adding a predetermined image to an image based on the received print data.

18. The printing apparatus according to claim 1, wherein the one or more processors add the first print setting value to the one or more print setting value included in the received print data.

19. The printing apparatus according to claim 1, wherein, in a case that the first print setting value and the second print setting value conflict with each other, the one or more processors receive the print data including the one or more print setting values that do not include the second print setting value and were changed from the one or more print setting values included in the request.

20. A control method of a printing apparatus storing a first print setting value as a print setting value which is used with a print setting value to be received from a communication terminal, the control method comprising:
  receiving, from the communication terminal, a request including one or more print setting values that include a second print setting value and do not include the first print setting value;
  determining whether the second print setting value included in the request conflicts with the stored first print setting value;
  notifying the communication terminal of information based on a determination result of the determining;
  receiving, from the communication terminal that received the information, print data including one or more print setting values that do not include the second print setting value, wherein the one or more print setting values included in the print data were changed from the one or more print setting values included in the received request; and
  executing a process based on the print data and the stored first print setting value.

21. A non-transitory storage medium storing executable instructions, which when executed by one or more processors of a printing apparatus storing a first print setting value as a print setting value which is used with a print setting value to be received from a communication terminal, cause the printing apparatus to perform operations comprising:
  receiving, from the communication terminal, a request including one or more print setting values that include a second print setting value and do not include the first print setting value;
  determining whether the second print setting value included in the request conflicts with the stored first print setting value;
  notifying the communication terminal of information based on a determination result of the determining;
  receiving, from the communication terminal that received the information, print data including one or more print setting values that do not include the second print setting value, wherein the one or more print setting values included in the print data were changed from the one or more print setting values included in the received request; and
  executing a process based on the print data and the stored first print setting value.

* * * * *